US012236888B2

(12) United States Patent
Lee et al.

(10) Patent No.: US 12,236,888 B2
(45) Date of Patent: Feb. 25, 2025

(54) DISPLAY DEVICE

(71) Applicant: LG Display Co., Ltd., Seoul (KR)

(72) Inventors: Donghyeok Lee, Paju-si (KR); Changsung Lee, Paju-si (KR)

(73) Assignee: LG Display Co., Ltd. (KR)

( * ) Notice: Subject to any disclaimer, the term of this patent is extended or adjusted under 35 U.S.C. 154(b) by 0 days.

(21) Appl. No.: 18/541,506

(22) Filed: Dec. 15, 2023

(65) Prior Publication Data

US 2024/0257760 A1 Aug. 1, 2024

(30) Foreign Application Priority Data

Jan. 31, 2023 (KR) ........................ 10-2023-0013336

(51) Int. Cl.

| | |
|---|---|
| ***G09G 3/3258*** | (2016.01) |
| ***G09G 3/00*** | (2006.01) |
| ***G09G 3/3208*** | (2016.01) |
| ***G09G 3/3233*** | (2016.01) |

(52) U.S. Cl.

CPC ........... *G09G 3/3258* (2013.01); *G09G 3/006* (2013.01); *G09G 2300/043* (2013.01); *G09G 2300/0819* (2013.01); *G09G 2300/0842* (2013.01); *G09G 2330/10* (2013.01); *G09G 2360/16* (2013.01)

(58) Field of Classification Search

None

See application file for complete search history.

(56) References Cited

U.S. PATENT DOCUMENTS

| | | | | |
|---|---|---|---|---|
| 10,769,989 | B2 * | 9/2020 | Chen | G09G 3/006 |
| 2014/0176516 | A1 * | 6/2014 | Kim | G09G 3/3233 345/204 |
| 2018/0151099 | A1 * | 5/2018 | Choi | G09G 3/006 |
| 2019/0189038 | A1 * | 6/2019 | Park | G09G 3/3225 |
| 2020/0168154 | A1 * | 5/2020 | Cheng | G09G 3/3258 |
| 2023/0055768 | A1 * | 2/2023 | Im | G09G 3/2096 |
| 2024/0257760 | A1 * | 8/2024 | Lee | G09G 3/006 |

* cited by examiner

*Primary Examiner* — Sepehr Azari

(74) *Attorney, Agent, or Firm* — Fish & Richardson P.C.

(57) ABSTRACT

Disclosed is a display device including: pixels each including a driving transistor that includes a first electrode receiving a high-potential driving voltage, a second electrode connected to an anode of a light emitting element, and a gate electrode receiving a data voltage; a source driving integrated circuit (IC) configured to receive a sensing information output from each of the pixels and corresponding to a threshold voltage of the driving transistor; and a timing controller configured to calculate the threshold voltage of the driving transistor in each pixel based on the sensing information, the timing controller including: a defective pixel detector configured to detect a defective pixel by receiving the sensing voltages of the pixels from the source driving IC, and a sensing range controller configured to adjust a first sensing range preset for the ADC upon presence of the defective pixel detected by the defective pixel detector.

13 Claims, 11 Drawing Sheets

DISPLAY DEVICE

CROSS-REFERENCE TO RELATED APPLICATIONS

The present application claims priority to Korean Patent Application No. 10-2023-0013336, filed Jan. 31, 2023, the entire contents of which is incorporated herein for all purposes by this reference.

BACKGROUND

Field of the Disclosure

An aspect relates to a display device.

Description of the Related Art

With development of multimedia, display devices are becoming increasingly important. Accordingly, various types of display devices such as an organic light emitting display (OLED) and a liquid crystal display (LCD) are being used.

The display device refers to a device that displays an image, and includes a self-luminance display device including a light emitting diode. The self-luminance display device includes an organic light emitting display device that uses an organic material as a light emitting material in the light emitting diode, an inorganic light emitting display device that uses an inorganic material as the light emitting material, or the like.

SUMMARY

An aspect of the disclosure is to provide a display device capable of controlling a sensing range and a compensation range.

According to an aspect, a display device includes: pixels each including a driving transistor that includes a first electrode receiving a high-potential driving voltage, a second electrode connected to an anode of a light emitting element, and a gate electrode receiving a data voltage; a source driving integrated circuit (IC) configured to receive a sensing voltage, which is output from each of the pixels and reflects a threshold voltage of the driving transistor, through an analog-to-digital converter (ADC); and a timing controller configured to calculate the threshold voltage of the driving transistor in the pixel based on the sensing voltage output from each of the pixels and reflecting the threshold voltage of the driving transistor, the timing controller including: a defective pixel detector configured to detect a defective pixel by receiving the sensing voltages of the pixels from the source driving IC, and a sensing range controller configured to adjust a first sensing range preset for the ADC when it is identified that the defective pixel is detected by the defective pixel detector.

A display device according to embodiments may control the sensing range and the compensation range.

DETAILED DESCRIPTION

Below, aspects will be described with reference to the accompanying drawings. In this disclosure, when a certain element (or area, layer, portion, etc.) is referred to as being "on," "connected to," or "coupled to" another element, it may be directly on, connected to, or coupled to the other element, or a third element may be intervened therebetween.

Like numerals refer to like elements. Further, in the accompanying drawings, the thicknesses, proportions, and dimensions of the elements area exaggerated for effective technical description. The term "and/or" includes any of one or more combinations that may be defined by associated elements Although the terms first, second, etc. may be used herein to describe various elements, these elements are not limited by these terms. These terms are only used to distinguish one element from another element. For example, a first element may be termed a second element, and, similarly, a second element may also be termed a first element, without departing from the scope of the disclosure. The singular forms are intended to include the plural forms as well, unless the context clearly indicates otherwise.

The terms "beneath," "below," "above," "upper" and the like are used for describing a relationship between the elements shown in the accompanying drawings. These terms are relative, and described with reference to the orientation shown in the accompanying drawings.

It should be understood that the terms "include" or "have" are merely intended to indicate that the features, numbers, steps, operations, elements, components, or combinations thereof are present, and are not intended to exclude a possibility that one or more other features, numbers, steps, operations, elements, components, or combinations thereof will be present or added.

Figure 1:
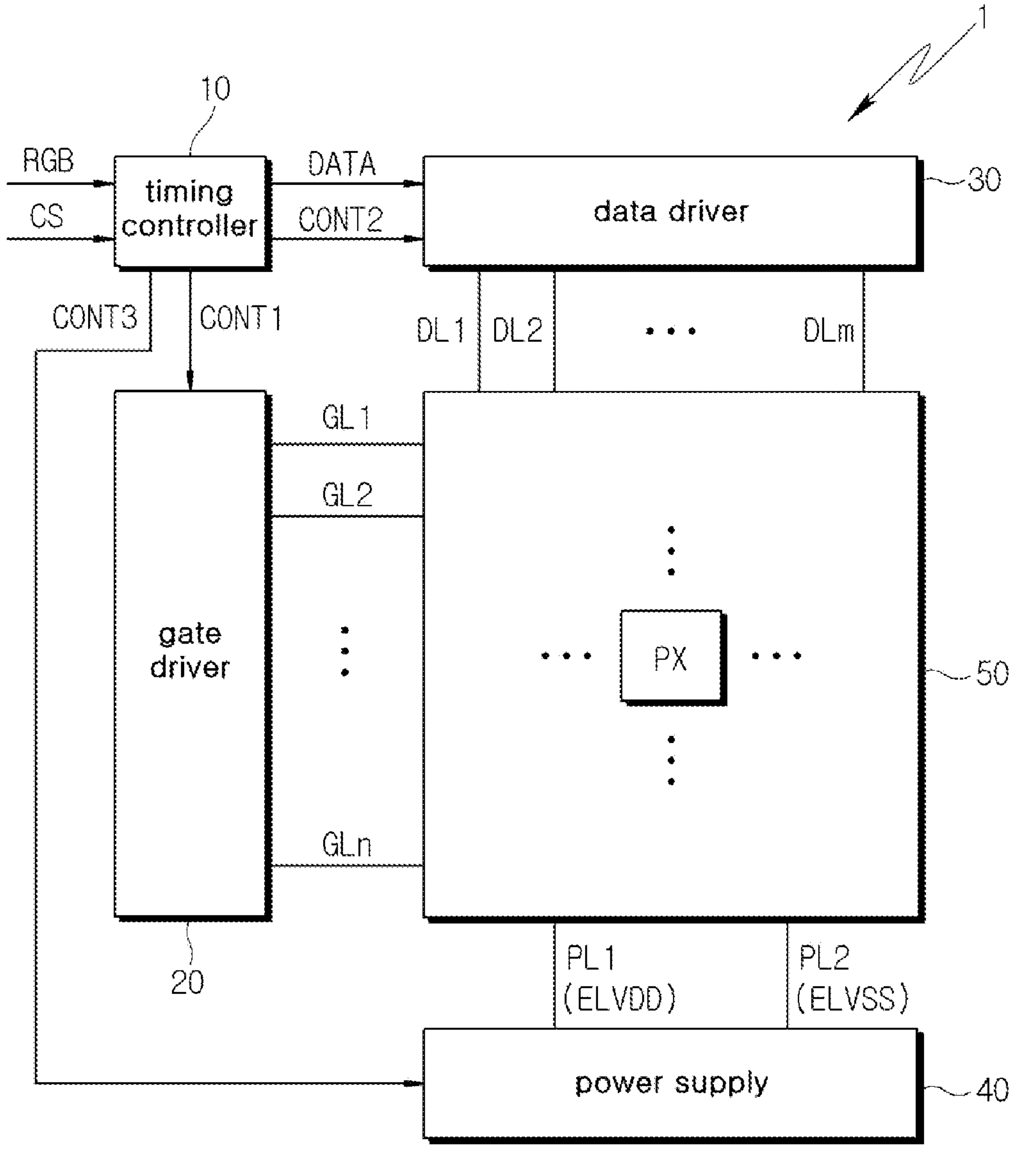
FIG. 1 is a block diagram of a display device according to an aspect.

FIG. 1 is a block diagram of a display device according to an aspect.

Referring to FIG. 1, a display device 1 includes a timing controller 10, a gate driver 20, a data driver 30, a power supply 40, and a display panel 50.

The timing controller 10 may receive an image signal RGB and a control signal CS from an external source or device. The image signal RGB may include a plurality of pieces of grayscale data. The control signal CS may, for example, include a horizontal synchronization signal, a vertical synchronization signal, and a main clock signal.

The timing controller 10 may process the image signal RGB and the control signal CS to be suitable for operation conditions of the display panel 50, and output image data DATA, a gate driving control signal CONT1, a data driving control signal CONT2, and a power supplying control signal CONT3.

The gate driver 20 may be connected to the pixels PX of the display panel 50 through a plurality of gate lines GL1 to GLn. The gate driver 20 may generate gate signals based on the gate driving control signal CONT1 output from the timing controller 10. The gate driver 20 may provide the generated gate signals to the pixels PX through the plurality of gate lines GL1 to GLn.

The data driver 30 may be connected to the pixels PX of the display panel 50 through a plurality of data lines DL1 to DLn. The data driver 30 may generate data signals based on the image data DATA and the data driving signal CONT2 output from the timing controller 10. The data driver 30 may output the generated data signals to the pixels PX through the plurality of data lines DL1 to DLn.

The power supply 40 may be connected to the pixels PX of the display panel 50 through a plurality of power lines PL1 and PL2. The power supply 40 may generate a driving voltage supplied to the display panel 50 based on the power supplying control signal CONT3. The driving voltage may, for example, include a high-potential driving voltage ELVDD and a low-potential driving voltage ELVSS. The power supply 40 may provide the generated driving voltages ELVDD and ELVSS to the pixels PX through the corresponding power lines PL1 and PL2.

A plurality of pixels PX is disposed on the display panel 50. The pixels PX may, for example, be arranged in the form of a matrix on the display panel 50.

Each pixel PX may be electrically connected to the corresponding gate line and the corresponding data line. The pixels PX may emit light with brightness corresponding to the gate signals and the data signals supplied through the gate lines GL1 to GLn and the data lines DL1 to DLn.

Each pixel PX may display one of first to third colors. For example, each pixel PX may display one of colors such as red, green, and blue. Alternatively, each pixel PX may display one of colors such as cyan, magenta, and yellow. Alternatively, the pixels PX may be configured to display one of four or more colors. For example, each pixel PX may display one of colors such as red, green, blue, and white.

The timing controller 10, the gate driver 20, the data driver 30, and the power supply 40 may be respectively configured by individual integrated circuits (IC), or at least some of them may also be integrated into a single IC. For example, at least one of the data driver 30 and the power supply 40 may be configured as a single IC integrated with the timing controller 10.

FIG. 1 illustrates that the gate driver 20 and the data driver 30 are illustrated as separate from the display panel 50. However, at least one of the gate driver 20 and the data driver 30 may be implemented as an in-panel type and integral with the display panel 50. For example, the gate driver 20 may be formed integrally with the display panel 50 based on a gate-in-panel (GIP) type.

Figure 2:
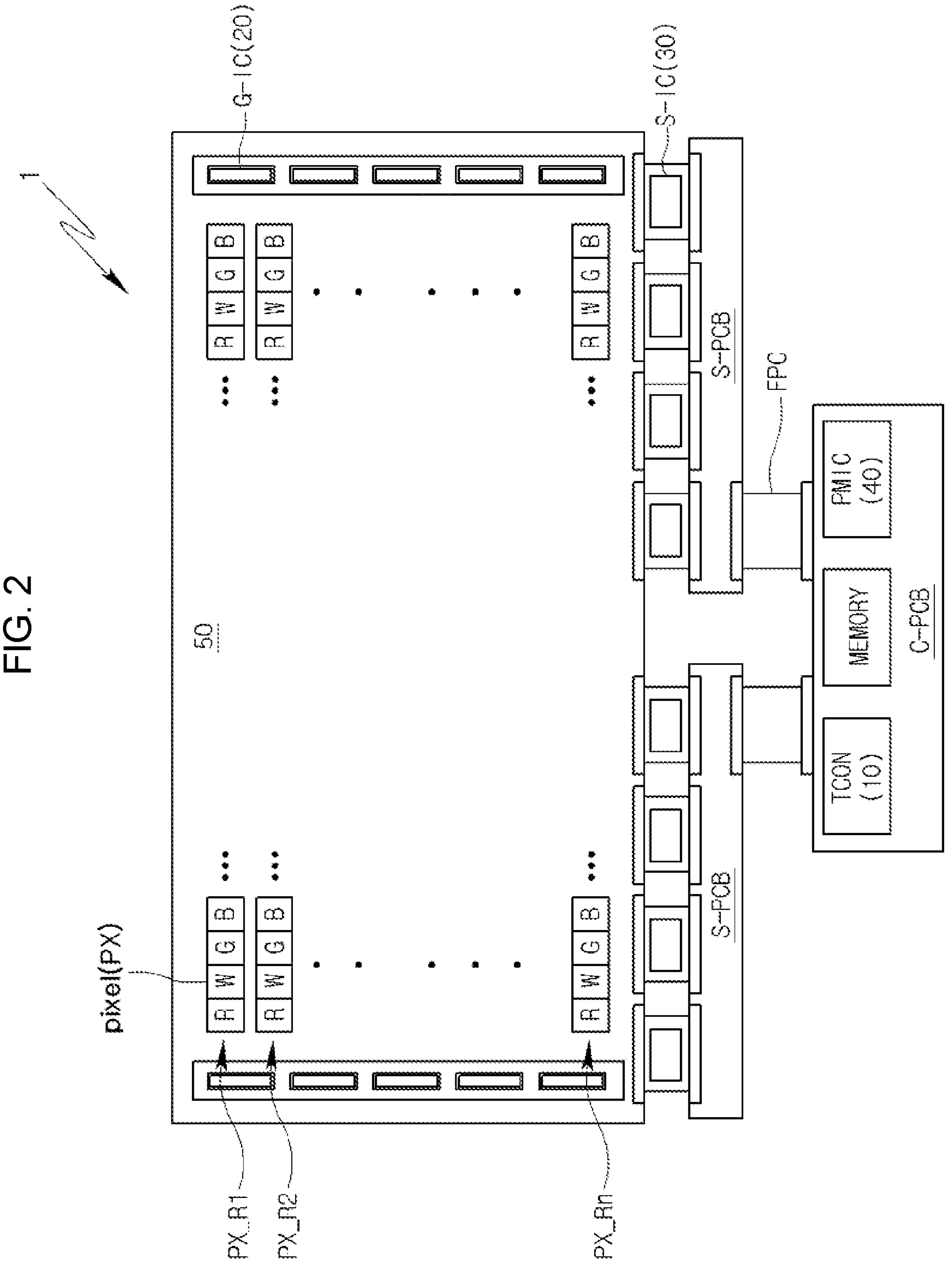
FIG. 2 is a diagram showing a display device according to an aspect.

FIG. 2 is a diagram showing a display device according to an aspect of the disclosure.

Referring to FIG. 2, the display panel 50 has a rectangular shape, and includes a plurality of pixels PX arranged in rows and columns therein. The plurality of pixels PX may, for example, include four sub-pixels, and the four sub-pixels may include red sub-pixel R, white sub-pixel W, green sub-pixel G, and blue sub-pixel B. As shown in FIG. 2, the plurality of pixels PX may form a plurality of pixel rows PX_R1 to PX_Rn. The plurality of pixel rows PX_R1 to PX_Rn are spaced apart from each other in a column direction. For example, the number of pixel rows PX_R1 to PX_Rn may be, but not limited to, 2,160.

Further, the display device 1 includes a gate driving IC (G-IC) 20. The display panel 50 may be implemented as the GIP type with the gate driving IC 20 arranged therein. The gate driving IC 20 may be formed at the left side, right side, or left and right sides of the display panel 50.

Further, the display device 1 includes a data driving IC (or a source driving IC (S-IC)) 30. The source driving IC 30 may be attached to a bottom of the display panel 50, and a plurality of source driving IC 30 may be attached in a transverse direction of the display panel 50. Such a source driving IC 30 may be implemented as a chip-on-film (COF) type to be disposed on a printed circuit board (PCB), a flexible PCB (FPCB), or a chip-on-glass (COG) type to be disposed on a glass board of the display panel 50. For example, in the aspect shown in FIG. 2, the source driving IC 30 is implemented as the COF type, and the display panel 50 and the source PCB (S-PCB) are connected by pad connection of the FPCB. The source driving IC 30 may apply voltages (a source IC driving voltage, ELVDD, ELVSS, VREF, etc.) from a control PCB (C-PCB) to the display panel 50.

The source PCB S-PCB may be connected to the display panel 50 through the FPCB from the bottom of the display panel 50 and may be connected to the control PCB (C-PCB through a flexible flat cable (FFC). The source PCB (S-PCB) is directly connected to the source driving IC 30 and transmits a gate signal to the gate driving IC 20. Further, the source PCB (S-PCB) supplies various power sources (e.g., ELVDD, ELVSS, VGH, VHL, VREF, etc.) from the control PCB (C-PCB) to the display panel 50. Further, the control PCB (C-PCB) and the gate driving IC 20 are connected through the leftmost or rightmost source driving IC 30 of the source PCB (S-PCB). For example, a gate driving IC driving voltage, a gate high voltage VGH, a gate low voltage VGL, etc. are applied from the control PCB (C-PCB) to the gate driving IC 20 through the source PCB (S-PCB).

The control PCB (C-PCB) is disposed at the bottom of the display panel 50 and connected to the source PCB (S-PCB) through the cable (e.g., the FFC). The control PCB (C-PCB) may include a timing controller (TCON) 10, a power supply (PMIC) 40, and a memory MEMORY. The timing controller 10 and the power supply 40 are the same as those described with reference to FIG. 1. Further, a device may be configured to calculate parameters for an algorithm for different areas for each frame of output image data, store compensation data, and store various parameters for algorithm calculation or various parameters for tuning. In this case, and the control PCB (C-PCB) may include a volatile memory and/or a nonvolatile memory for storing parameters, compensation data, and other information for controlling output of the display panel 50.

Figure 3:
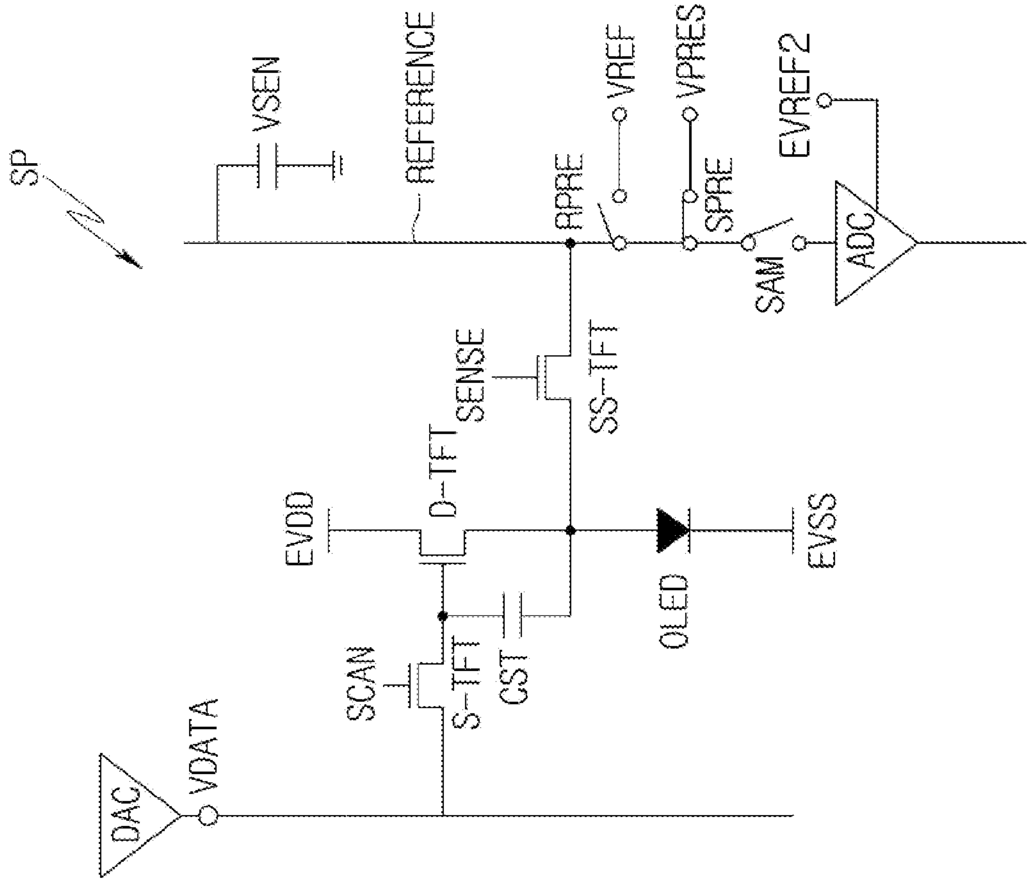
FIG. 3 is a diagram for illustrating a structure of a pixel according to an aspect.

FIG. 3 is a diagram for illustrating a structure of a pixel according to an aspect of the disclosure.

Referring to FIG. 3, a sub-pixel SP receives data voltage VDATA from the source driving IC (S-IC) through a digital-to-analog converter (DAC). Further, a sensing voltage VSEN may be output from the sub-pixel SP and is provided to the source driving IC (S-IC) through an analog-to-digital converter (ADC). Further, each sub-pixel is connected to a high-potential driving voltage ELVDD and a low-potential driving voltage ELVSS.

The sub-pixel SP includes a scan transistor S-TFT, a driving transistor D-TFT, and a sensing transistor SS-TFT. Each sub-pixel includes a storage capacitor CST, and a light emitting element OLED.

The scan transistor S-TFT includes a first electrode (for example, a drain electrode) that is connected to a data line DATA. The source driving IC (S-IC) outputs a data voltage VDATA to the data line DATA via the DAC. The scan transistor S-TFT includes a second electrode (for example, a source electrode) that is connected to a first end of the storage capacitor CST and also connected to the gate electrode of the driving transistor D-TFT. The gate electrode of the scan transistor S-TFT is connected to the scan line SCAN. In this case, the scan transistor S-TFT is turned on when receiving the gate signal having a gate-on level through the scan line SCAN, and transmits a data signal applied through the data line DATA to the first end of the storage capacitor CST.

The first end of the storage capacitor CST is connected to the second electrode of the scan transistor S-TFT. The sensing transistor SS-TFT includes a second electrode (for example, a drain electrode) that is connected to a second end of the storage capacitor CST and the second electrode of the driving transistor D-TFT. The storage capacitor CST may be charged with a voltage corresponding to a difference between the voltage applied to the first end thereof and a reference voltage VPRES applied to the second end thereof through a switch SPRE and the sensing transistor SS-TFT.

The driving transistor D-TFT includes the first electrode (for example, the drain electrode) that is configured to receive the high-potential driving voltage ELVDD, and the second electrode (for example, the source electrode) connected to a first electrode (for example, an anode) of the light emitting element OLED. The driving transistor D-TFT includes a third electrode (for example, a gate electrode) connected to the first end of the storage capacitor CST. The driving transistor D-TFT may control the amount of driving current flowing in the light emitting element OLED corresponding to the voltage applied to the gate electrode thereof. In this case, the current may be based on the voltage difference of the driving transistor D-TFT (or the stored voltage of the storage capacitor CST) and a voltage applied to the light emitting element OLED.

The sensing transistor SS-TFT includes a first electrode (for example, a source electrode) connected to a reference line REFERENCE, and the second electrode (for example, the drain electrode) connected to the second end of the storage capacitor CST, and a third electrode (for example, a gate electrode) connected to a sensing line SENSE. In this case, gate driving IC (G-IC) provides a sensing signal SENSE that turns on the transistor SS-TFT, and applies the reference voltage VPRES to the second end of the storage capacitor CST. When the switch SPRE and a switch SAM are all turned off and the sensing transistor SS-TFT is turned on, the stored voltage of the storage capacitor CST is applied to a capacitor connected to the reference line, and the capacitor of the reference line stores the sensing voltage VSEN. The reference line REFERENCE may be provided with a driving switch RPRE, and the driving switch RPRE may selectively apply a driving reference voltage VREF to the reference line REFERENCE.

When the switch SPRE is turned off and the switch SAM is turned on, the sensing voltage VSEN is output to the source driving IC (S-IC) through the ADC. The output voltage is used to sense and sample the degradation of the corresponding sub-pixel. In other words, a voltage for compensating the corresponding sub-pixel is sensed and sampled. Specifically, the mobility and the threshold voltage of the driving transistor D-TFT may be measured, and the compensation may be implemented based on sensing the mobility and the threshold voltage of the driving transistor D-TFT.

The light emitting element OLED emits light corresponding to a driving current. The light emitting element OLED may emit light corresponding to one of colors such as red, white, green and blue. The light emitting element OLED according to an aspect may be, but not limited to, an organic light emitting diode (OLED), or a subminiature inorganic light emitting diode. In some cases, a subminiature inorganic light emitting diode may have a size a micro to nanoscale range. Below, technical ideas of an aspect will be described with reference to an example where the organic light emitting diode is provided as the light emitting element OLED.

In the aspect shown in FIG. 3, the switching transistor S-TFT, the driving transistor D-TFT, and the sensing transistor SS-TFT are, but not limited to, N-channel metal oxide semiconductor (NMOS) transistors. For example, at least some or all of the transistors in each pixel PX may be P-channel metal oxide semiconductor (PMOS) transistors. In some aspects, each of the switching transistor and the driving transistor may be implemented as a low temperature poly silicon (LTPS) thin film transistor, an oxide thin film transistor, or a low temperature polycrystalline oxide (LTPO) thin film transistor.

FIGS. 4 to 7 are diagrams for illustrating compensations for features of a driving transistor after powering off the display device in accordance with aspects of the disclosure.

In some cases, the compensation techniques of the driving transistor D-TFT in this description may be made while the display device 1 is powered off and displays no images. Aspects of the disclosure include sensing a threshold voltage characteristic of the driving transistor D-TFT and compensating for a deviation thereof, but not limited thereto. Alternatively or additionally, other characteristics of the driving transistor D-TFT may be sensed, such as a mobility characteristic, and techniques for compensating for a deviation of the mobility characteristic. Below, for convenience of description, the following description will be made on the presumption that the compensation is based on sensing the threshold voltage characteristic of the driving transistor D-TFT and compensating for the deviation thereof.

In some aspects, the threshold voltage characteristic may be sensed while powering off the display device. For example, while powering down the display device, a black image may be displayed and the threshold voltage characteristics or mobility characteristics can be sensed. The characteristics can also be sensed at other times, such as during power up.

Figure 4:
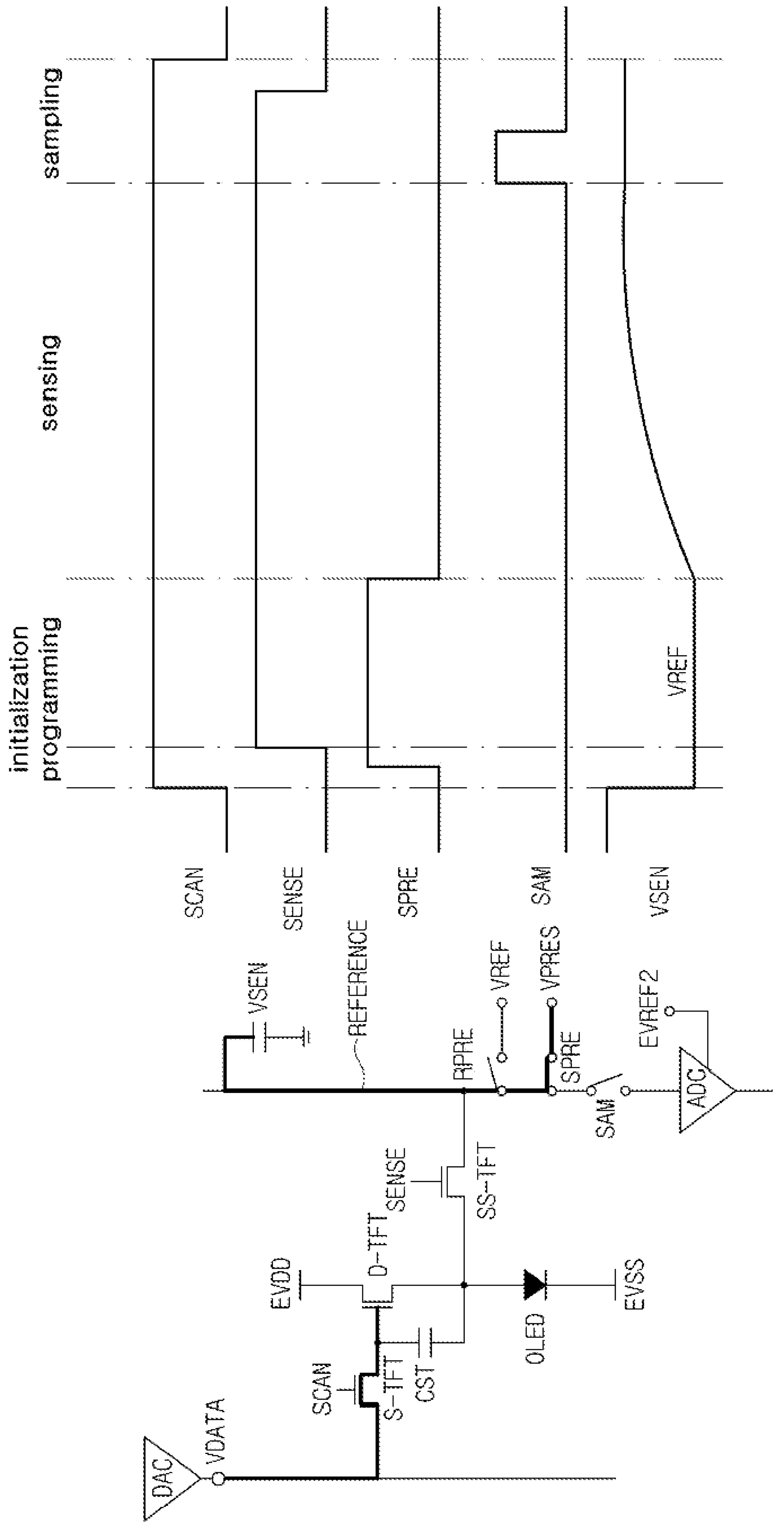
FIGS. 4 to 7 are diagrams for illustrating compensations for features of a driving transistor after powering off the display device.

Referring to FIG. 4, the sensing of the characteristics may be performed based on discrete time periods including an initialization period, a programming period, a sensing period, and a sampling period. During the initialization period, the scan transistor S-TFT is turned on, and the first end of the storage capacitor CST is charged to correspond to the data voltage VDATA. Further, the second end of the storage capacitor CST is floated, and thus the voltage applied to the second end of the storage capacitor CST increases by the same rate as the voltage applied to the first end of the storage capacitor CST increases due to the capacitor characteristics. In the initialization section, the switch SPRE may also turned on.

Figure 5:
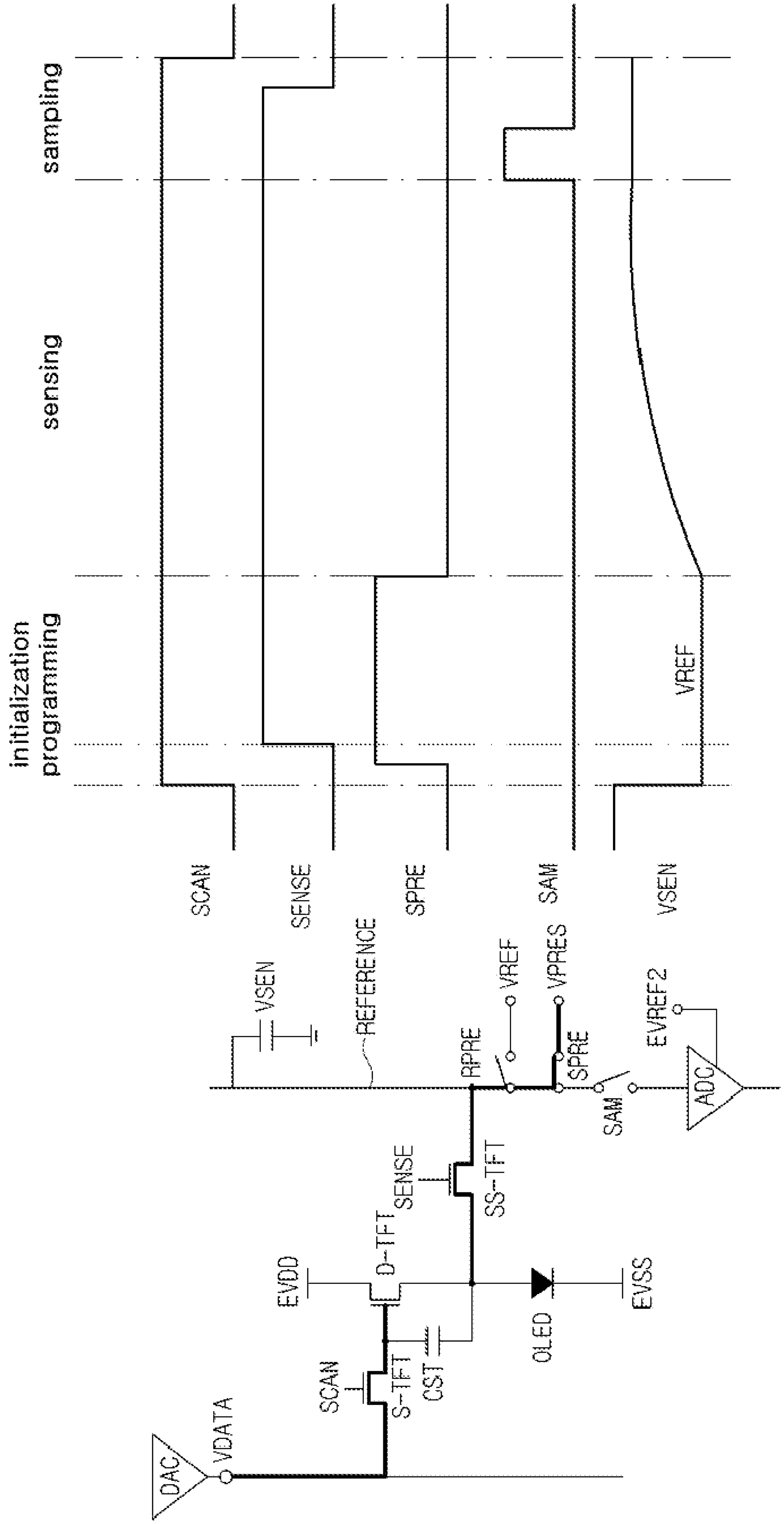

Referring to FIG. 5, during a programming period, the switch SPRE is maintained in an on state, and the sensing transistor SS-TFT is turned on, thereby applying the reference voltage VPRES to the second end of the storage capacitor CST. The reference voltage VPRES may be the first reference voltage. The power supply 40, for example as shown FIG. 2, may supply a first reference voltage to the reference line REFERENCE.

Figure 6:
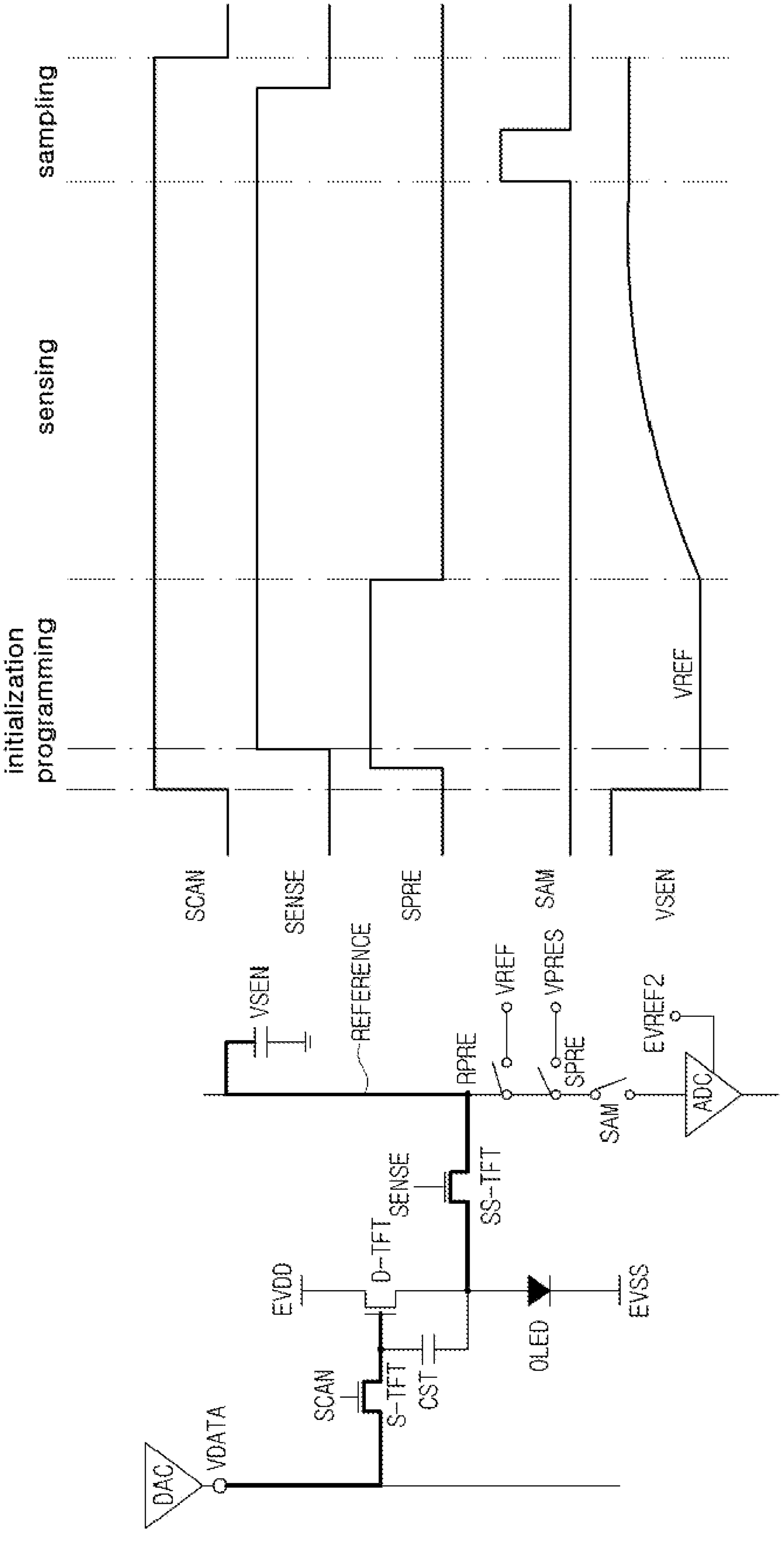

Referring to FIG. 6, during the sensing period, the scan transistor S-TFT and the sensing transistor SS-TFT are maintained in the on state and the switch SPRE is turned off. Because the driving current flows from the first electrode of the driving transistor D-TFT to the second electrode, the voltage applied to the second end of the storage capacitor CST increases, but the voltage of the first end of the storage capacitor CST is maintained as the data voltage VDATA. Further, the driving current gradually decreases based on the increase voltage applied to the second end of the storage capacitor CST, and thus the sensing voltage VSEN increases as shown in FIG. 6.

Figure 7:
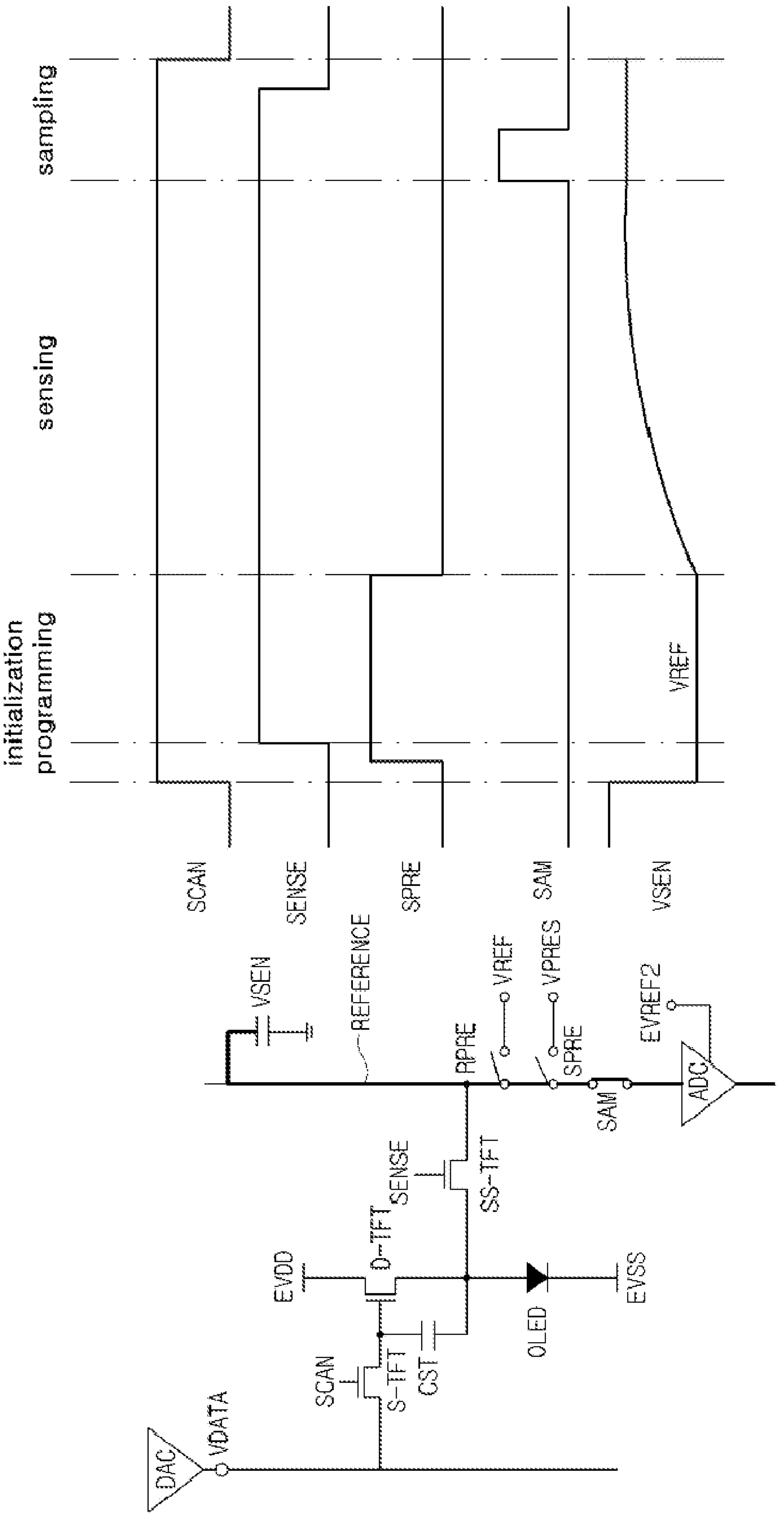

Referring to FIG. 7, during the sampling period, the sensing transistor SS-TFT is turned off, and the switch SAM is turned on. Therefore, the sensing voltage VSEN is applied to the source driving IC (S-IC) through the reference line REFERENCE line via the ADC. The source driving IC (S-IC) receives the sensing voltage VSEN and may calculate the threshold voltage characteristics of the corresponding driving transistor.

Figure 8:
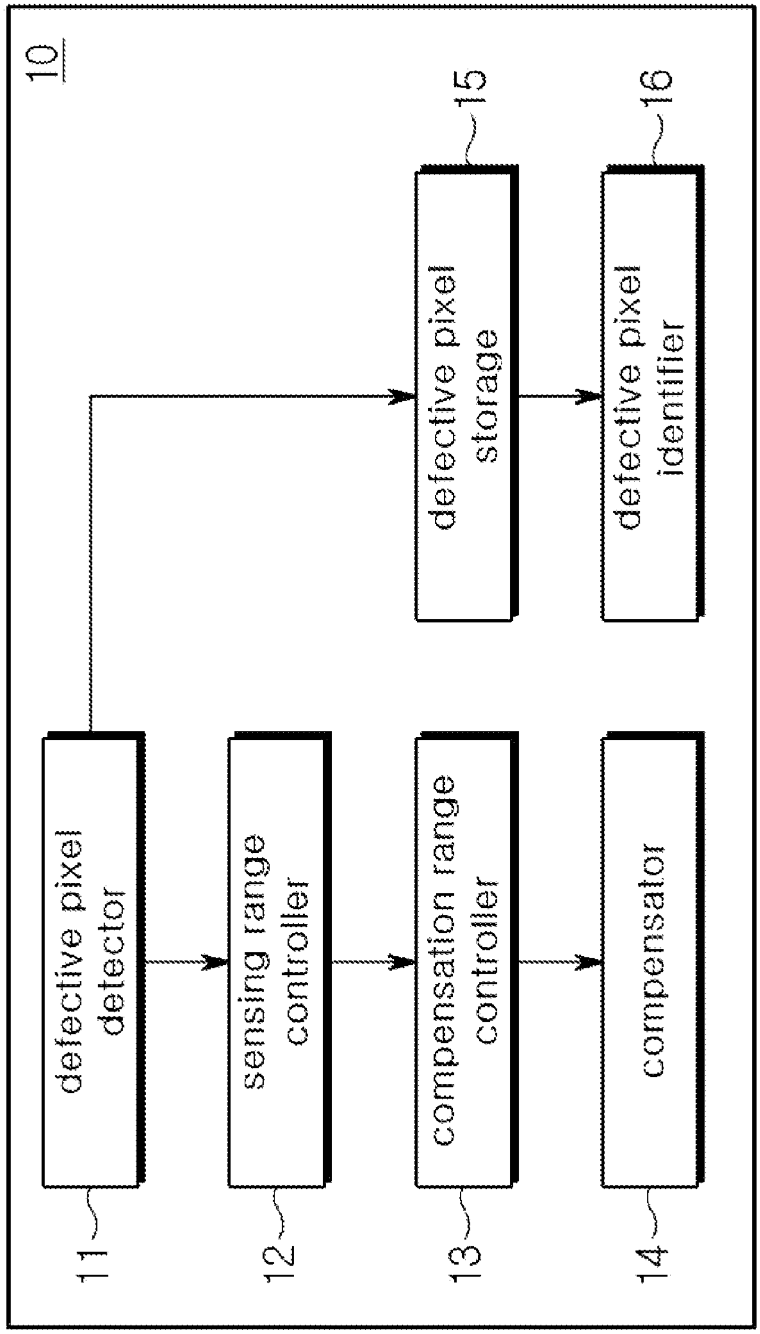
FIG. 8 is a diagram showing configurations of a timing controller according to an aspect.
Figure 9:
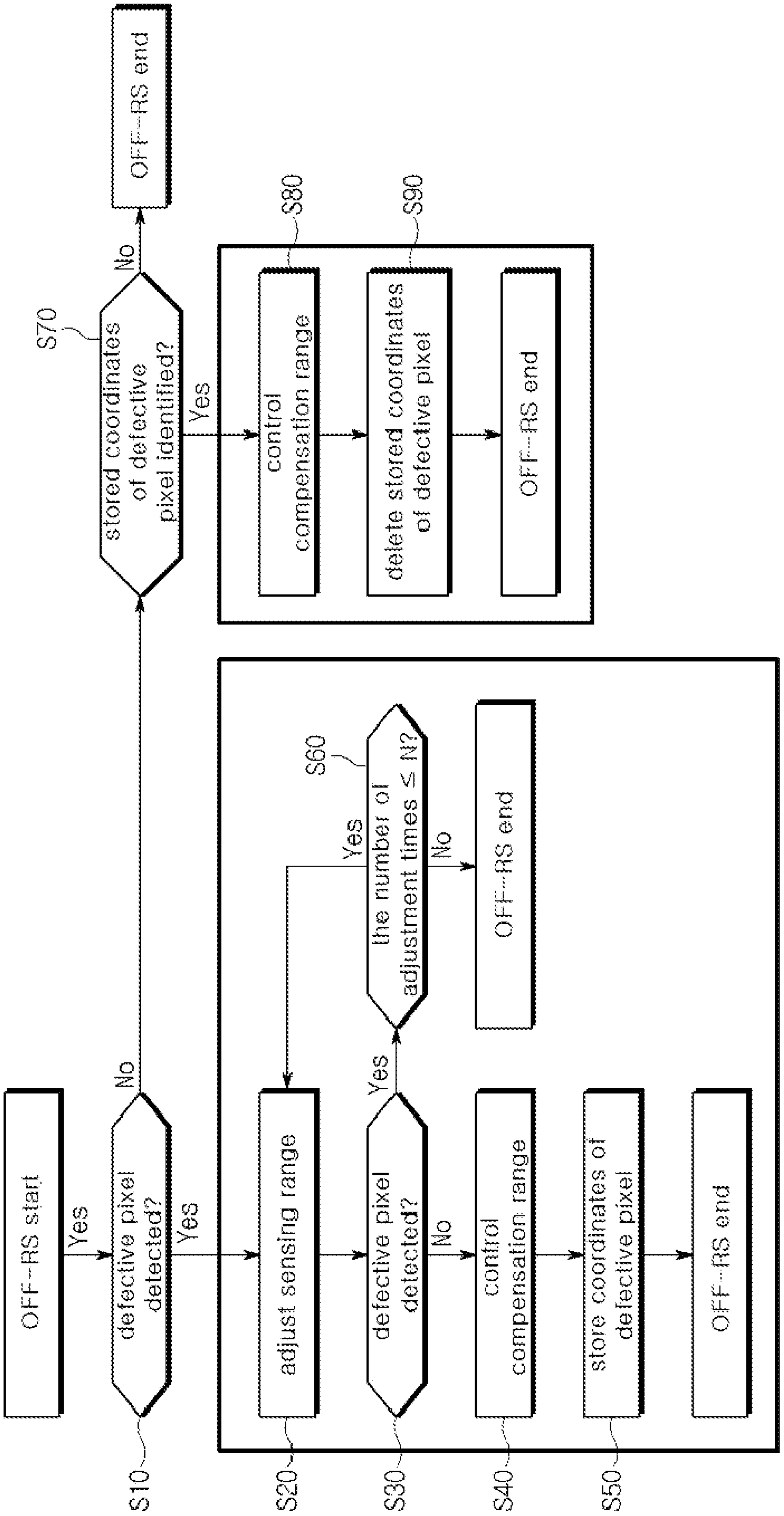
FIG. 9 is a flowchart showing a method of driving a display device according to an aspect.
Figure 10:
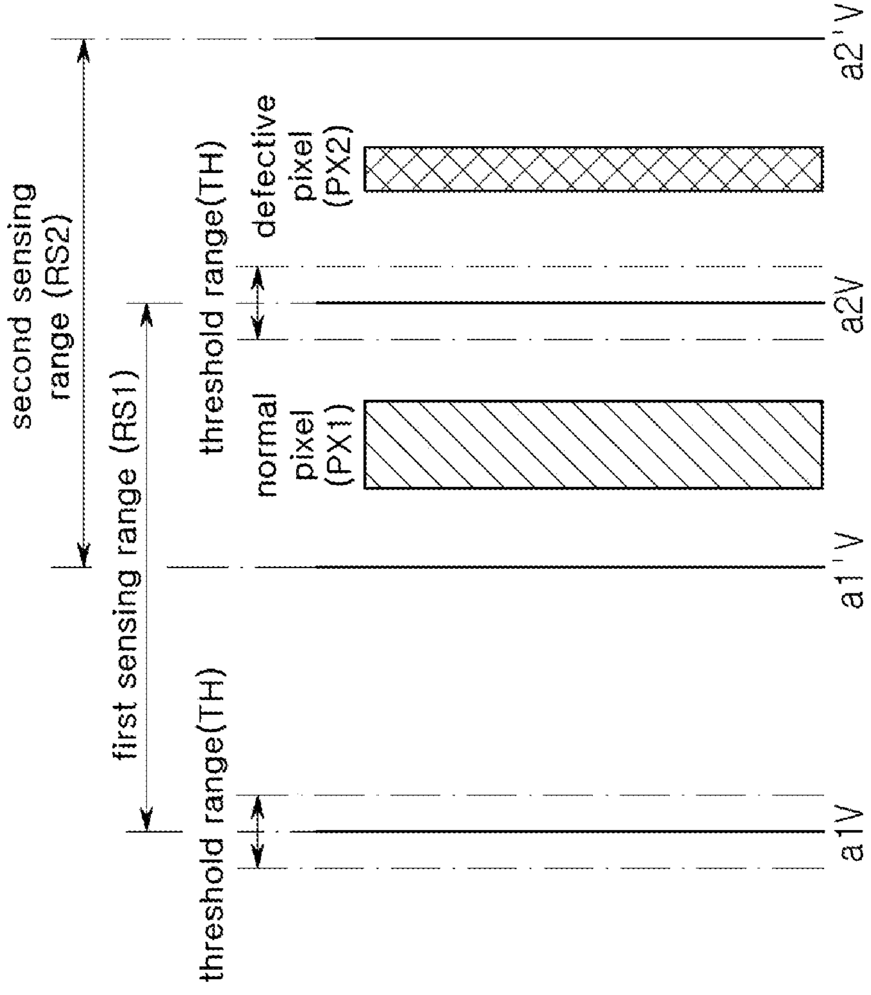
FIG. 10 is a diagram showing a sensing range control of a display device according to an aspect.
Figure 11:
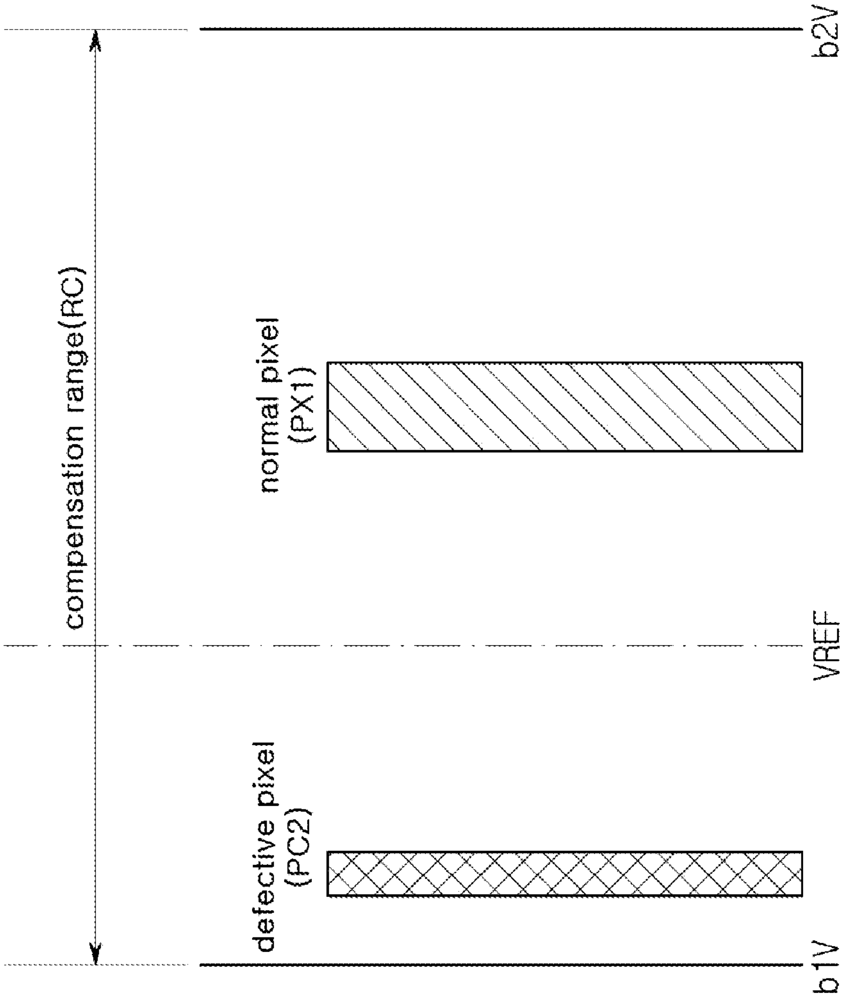
FIG. 11 is a diagram showing a compensation range control of a display device according to an aspect.

FIG. 8 is a diagram showing configurations of a timing controller according to an aspect of the disclosure. FIG. 9 is a flowchart of a method of driving a display device according to an aspect of the disclosure. FIG. 10 is a diagram showing a sensing range control of a display device according to an aspect of the disclosure. FIG. 11 is a diagram showing a compensation range control of a display device according to an aspect of the disclosure.

In one aspect, referring to FIGS. 1, 4, 8 to 11, the sensing of the threshold voltage characteristic starts after the display device is powered off (e.g., during a power down cycle). In one example, a defective pixel may be detected at block S10. Below, the description presumes that the pixels PX1 in FIG. 1 include normal pixels PX1 and defective pixels PX2. Normal pixels PX1 refer to the pixels PX of which the sensing voltage VSEN is within a first sensing range RS1. Defective pixels PX2 refer to the pixels PX include a sensing voltage VSEN out of the first sensing range RS1. For example, the first sensing range RS1 may have a voltage range from a first voltage (V) a1 to a second voltage (V) a2. In other words, the pixel PX of which the sensing voltage VSEN reflecting the threshold voltage of the driving transistor D-TFT thereof is in the voltage range from the first voltage (V) a1 to the second voltage (V) a2 may be the normal pixel PX1, and the pixel of which the sensing voltage VSEN reflecting the threshold voltage of the driving transistor D-TFT thereof is out of the voltage range from the first voltage (V) a1 to the second voltage (V) a2 may be the defective pixel PX2.

After powering off the display device, the threshold voltage characteristic may be sensed by the source driving IC (S-IC). The source driving IC (S-IC) may receive the sensing voltage VSEN applied from each of the pixels PX through the ADC. For example, because the sensing voltage VSEN applied from each of the pixels PX is received through the ADC, the source driving IC (S-IC) may receive a digital value converted from the sensing voltage VSEN. The source driving IC (S-IC) may calculate the threshold voltages of the pixels PX based on the digital values converted from the sensing voltages VSEN. Likewise, the calculated threshold voltage may also be a digital value. In the following, for case of description, a digital or analog threshold voltage or voltage level will be expressed in an analog form (in other words, even though the threshold voltage is expressed in an analog format, it may be easily expressed in a digital format). Therefore, the first sensing range RS1 described above is exemplified as having an analog voltage range from the first voltage (V) a1 to the second voltage (V) a2 but may also be a voltage range converted from the analog format into the digital format.

The source driving IC (S-IC) may provide information corresponding to the calculated threshold voltage of the pixels PX to the timing controller 10.

The timing controller 10 may include a defective pixel detector 11, a sensing range controller 12, a compensation range controller 13, a compensator 14, a defective pixel storage 15, and a defective pixel identifier 16.

The source driving IC (S-IC) may provide the information corresponding to the calculated threshold voltages of the pixels PX to the defective pixel detector 11. The defective pixel detector 11 may detect the defective pixel at block S10 by distinguishing between the normal pixel PX1 and the defective pixel PX2 based on the sensing voltage VSEN. The defective pixel detector 11 may detect the defective pixel based on the sensing voltage VSEN provided to the source driving IC (S-IC) through the ADC. In some aspects, the sensing voltage VSEN may reflect correction values to compensate for a deviation between the source driving ICs (S-IC). For example, the sensing voltage VSEN may have a voltage level for which the sensing voltage provided through the ADC is corrected (e.g., a gain or offset). In the following, the corrected sensing voltage VSEN will be described. The range of the sensing voltage VSEN to be recognized by the ADC may be predetermined. The recognizable range of the sensing voltage VSEN may be the first sensing range RS1. However, when the sensing voltage VSEN, which may be out of the first sensing range RS1 for the defective pixel PX2, is provided to the ADC, (1) the sensing voltage VSEN for the defective pixel PX2 is not provided to the source driving IC (S-IC) because the sensing voltage VSEN out of the first sensing range RS1 is not recognized by the ADC, or (2) the first voltage a1 or the second voltage a2 or (3) a voltage approximate to the voltage a1 or a2 is recognized and provided as the sensing data to the source driving IC (S-IC). In other words, the defective pixel detector 11 may detect the pixels PX corresponding to the cases 1) to 3) as the defective pixel PX2.

Below, the cases (2) and (3) will be described. To increase the reliability of the defective pixel detection at block S10, the sensing voltage VSEN may be calculated by sensing at least once the pixels PX of which the sensing voltage VSEN is recognized, as case (2) the first voltage a1 or the second voltage a2 or case (3) the voltage approximate to the voltage a1 or a2. The first sensing range RS1 may include a threshold range TH. For example, the threshold range TH may have, but is not limited to, a range from a minimum value a1 of the first sensing range RS1 to the minimum value a1*1.1, from the minimum value a1*0.9 to the minimum value a1, a maximum value a2*0.9 to the maximum value a2, or the maximum value a2 to the maximum value a2*1.1. In other words, to increase the reliability, when the sensing voltages VSEN, which is calculated after the sensing is performed multiple times, are all within the threshold range TH, the defective pixel detector 11 may detect the corresponding pixels PX as the defective pixels PX2. However, in some cases, for speed, even in the cases of (2) and (3), when the sensing voltage VSEN is within the threshold range TH, the defective pixel detector 11 may detect the corresponding pixel PX as the defective pixel PX2.

Next, when the defective pixel PX2 is present, the sensing range is adjusted at block S20. The sensing range controller 12 adjusts the first sensing range RS1 (e.g., a sensitivity) previously set in the ADC when it is identified that the defective pixel PX2 is present. The adjustment of the first sensing range RS1 by the sensing range controller 12 may be based on the sensing voltage VSEN of the calculated defective pixel PX2. In other words, the sensing range controller 12 may adjust the first sensing range RS1 of the ADC so that the range of the sensing voltage VSEN can be recognized by the ADC and encompasses the sensing voltage VSEN of all the pixels PX (the normal pixels PX1+the defective pixels PX2). Meanwhile, the sensing range adjustment S20 may be repeated several times.

In some aspects, the first sensing range RS1 may be adjusted based on a sensing range reference voltage EVREF2 (e.g., as shown in FIG. 3). The sensing range reference voltage EVREF2 may be provided to the ADC. The first sensing range RS1 may be adjusted in such a manner such that the sensing range reference voltage EVREF2 is subtracted from the sensing voltage VSEN provided to the ADC. In other words, the sensing range controller 12 may adjust the first sensing range RS1 by adjusting the level of the sensing range reference voltage EVREF2 supplied to the ADC.

Referring to FIG. 9, the sensing range adjustment at block S20 is performed once, and then the defective pixel may be detected again at block S30. The defective pixel detection may be performed in the same way as the defective pixel detection S10, and thus repetitive descriptions thereof will be avoided. When the defective pixel PX2 is detected through the defective pixel redetection at block S30 (Yes in FIG. 9), the defective pixel redetection S30 is performed again. The number of detection times for the defective pixel redetection S30 may be set to be less than or equal to N at block S60. The sensing range for which the sensing range adjustment S20 has been performed two or more times as described above is set to a final sensing range (or a second sensing range RS2).

FIG. 10 illustrates an exemplary adjustment from the first sensing range RS1 to the second sensing range RS2 (the first voltage (a1 to a1') and the second voltage (a2 to a2')) in accordance with some aspects of the disclosure.

Referring back to FIG. 9, when the number of detection (adjustment) times for the defective pixel redetection at block S30 is greater than N, the display device is powered off and then the sensing of the threshold voltage characteristic is terminated.

When the defective pixel PX2 is not detected after the defective pixel redetection at block S30 (see 'N' in FIG. 9), a compensation range is controlled t block S40.

Through the defective pixel detections at blocks S10 and S30 and the sensing range adjustment at block S20 in FIG. 9, threshold voltages of the driving transistors D-TFT in all the pixels PX (PX1 and PX2) of the display panel 50 may be accurately calculated. The threshold voltage of the driving transistor D-TFT may be accurately calculated by a threshold voltage calculator of the timing controller 10. The compensation range control at block S40 may control (or adjust) the compensation range to compensate the deviation between the calculated threshold voltages of the normal pixel PX1 and the defective pixel PX2. Referring to FIG. 11, the compensation range control at block S40 may be performed through the compensation range controller 13. The compensation range (RC) for compensating the deviation between the threshold voltages may be a compensation range from b1V to b2V for compensating the threshold voltages of the driving transistors D-TFT, between which the deviation is generated, in the pixels PX.

Referring to FIG. 4, the driving current Ids flowing in the light emitting element OLED may be proportional to $(VDATA-Vth-Vs)^2$. The data voltage VDATA is a voltage (hereinafter referred to as Vg) applied to the gate electrode of the driving transistor D-TFT, Vth is a threshold voltage of the driving transistor D-TFT, and Vs is a voltage applied to the source electrode of the driving transistor D-TFT.

The voltage Vg applied to the gate electrode of the driving transistor D-TFT may have the same level as the data voltage VDATA.

When the threshold voltages of the driving transistors D-TFT in all the pixels PX (PX1 and PX2) of the display panel 50 are accurately calculated through the defective pixel detection at blocks S10 and S30 and the sensing range adjustment at block S20, deviations between a normal threshold voltage (hereinafter referred to as Vth1) and the threshold voltages Vth of the driving transistors D-TFT in the pixels PX may be calculated based on the normal threshold voltage Vth1, and the calculated deviations may be compensated by adjusting the level of the data voltage VDATA.

Meanwhile, because the data voltage VDATA has a level higher than zero, it may be difficult to compensate the threshold voltages Vth of the driving transistors D-TFT in some pixels PX.

Thus, the compensation range controller 13 controls a compensation voltage (hereinafter referred to as Vcom) and a driving reference voltage VREF, thereby compensating the threshold voltages Vth of the driving transistors D-TFT in all the pixels PX.

The compensation voltage Vcom may be calculated using the following Equation 1 and Equation 2.

$$Vcom = Vth + \alpha \qquad \text{(Equation 1)}$$

In equation 1, Vth is the threshold voltage of the driving transistor D-TFT of each pixel PX, and a is a voltage constant which is a rational number greater than 0.

$$Vg = VDATA + Vcom \qquad \text{(Equation 2)}$$

Because Vg is the voltage applied to the gate electrode of the driving transistor D-TFT and cannot be negative, a common voltage constant α is introduced to make Vg positive. For example, the voltage constant α may be calculated as the minimum value Vth' among the threshold voltages Vth of the driving transistors D-TFT in all the pixels PX.

The driving reference voltage VREF may be calculated using the following Equation 3.

$$VREF = VREF' + \alpha \qquad \text{(Equation 3)}$$

In equation 3, VREF' is a driving reference voltage and a is a voltage constant.

For example, the driving reference voltage VREF' may be, but not limited to, 0 V.

Through the foregoing Equations 1 to 3, the compensation voltage Vcom and the driving reference voltage VREF are calculated.

After the compensation range control S40, data about the pixels PX identified as the defective pixels PX2 through the defective pixel detection at block S10 (or the coordinates of the defective pixels PX2) is stored in the defective pixel storage 15, the display device is powered off, and then the sensing of the threshold voltage characteristic is terminated.

The compensator 14 controls the voltage applied to the gate electrode and the voltage applied to the source electrode of the driving transistor D-TFT in the pixel PX based on the compensation voltage Vcom calculated by the compensation range controller 13 and the driving reference voltage VREF, thereby controlling the driving current Ids flowing in the light emitting element OLED.

In other words, as shown in FIG. 4, the amount of driving current Ids flowing in the light emitting element OLED may be proportional to $(Vg\text{-}Vth\text{-}Vs)^2$. In this case, Vs is the voltage applied to the source electrode of the driving transistor D-TFT, which may have the same level as the driving reference voltage VREF, and Vg is the voltage applied to the gate electrode of the driving transistor D-TFT, which may have the same level as the sum of the data voltage VDATA and the compensation voltage Vcom. In other words, the amount of the driving current Ids flowing in the light emitting element OLED may be proportional to $(VDATA+Vcom-Vth-Vs)^2$.

Referring back to FIG. 9, when the defective pixel PX2 is not detected after the defective pixel detection at block S10, the defective pixel identifier 16 identifies the stored coordinates of the defective pixel at block S70.

When it is identified by the defective pixel identifier 16 that no coordinates of the defective pixel PX2 have been stored in the defective pixel storage 15, the display device is powered off and then the sensing of the threshold voltage characteristic is terminated.

When it is identified by the defective pixel identifier 16 that the coordinates of the defective pixel PX2 have been stored in the defective pixel storage 15, the compensation range is controlled at block S80. The compensation range control at block S80 may be performed by the same processes as the compensation range control S40, and thus repetitive descriptions thereof will be avoided. After performing the compensation range control S80, the coordinates of the defective pixel stored in the defective pixel storage 15 are deleted at block S90. After deleting the coordinates of the defective pixel stored in the defective pixel storage 15 at block S90, the display device is powered off and then the sensing of the threshold voltage characteristic is terminated.

For example, a display device may include: pixels each including a driving transistor that includes a first electrode receiving a high-potential driving voltage, a second electrode connected to an anode of a light emitting element, and a gate electrode receiving a data voltage; a source driving IC configured to receive a sensing voltage, which is output from each of the pixels and reflects a threshold voltage of the driving transistor, through an ADC; and a timing controller configured to calculate the threshold voltage of the driving transistor in the pixel based on the sensing voltage output from each of the pixels and reflecting the threshold voltage of the driving transistor, the timing controller including: a defective pixel detector configured to detect a defective pixel by receiving the sensing voltages of the pixels from the source driving IC, and a sensing range controller configured to adjust a first sensing range preset for the ADC when it is identified that the defective pixel is detected by the defective pixel detector.

For example, the pixels may include a normal pixel and the defective pixel, and the sensing voltage of the normal pixel may be in the first sensing range of the ADC.

For example, the sensing voltage of the defective pixel may be in a threshold range of the first sensing range.

For example, the sensing range controller may change the first sensing range into a second sensing range that encompasses both the sensing voltage of the normal pixel and the sensing voltage of the defective pixel.

For example, the timing controller may calculate the threshold voltage of the driving transistor in each of the normal pixel and the defective pixel based on the sensing voltage of the normal pixel and the sensing voltage of the defective pixel.

For example, the timing controller may further include a compensation range controller to compensate a deviation between the calculated threshold voltages of the driving transistors in the normal pixel and the defective pixel.

For example, the compensation range controller may calculate a compensation voltage applied to the gate electrode of the driving transistor, and a driving reference voltage applied to a source electrode of the driving transistor in each of the normal pixel and the defective pixel.

For example, the compensation voltage may be calculated by Equations 1 and 2 above.

Although embodiments of the disclosure have been described above with reference to the accompanying drawings, it will be understood by those skilled in the art to which the disclosure pertains that the disclosure may be embodied in other specific forms without departing from the technical spirits or essential features of the disclosure. It should be therefore understood that the embodiments described above are illustrative in all aspects and not limited. In addition, the scope of the disclosure is defined by the appended claims rather than by the foregoing detailed description. Further, all modifications or variations derived from the meaning and scope of the appended claims and their equivalents should be construed as falling into the scope of the disclosure.

What is claimed is:

1. A display device comprising:

pixels each comprising a driving transistor, the driving transistor comprising a first electrode receiving a high-potential driving voltage, a second electrode connected to an anode of a light emitting element, and a gate electrode receiving a data voltage;

a source driving integrated circuit (IC) configured to receive a sensing information output from each of the pixels and corresponding to a threshold voltage of the driving transistor; and a timing controller configured to calculate the threshold voltage of the driving transistor in each pixel based on the sensing information output, wherein the timing controller comprises:

a defective pixel detector configured to detect a defective pixel by receiving the sensing information of the pixels from the source driving IC, and a sensing range controller configured to adjust a first sensing range preset for an analog-to-digital converter (ADC) based on the defective pixel detected by the defective pixel detector.

2. The display device of claim 1, wherein the pixels comprise a normal pixel and the defective pixel, and a sensing voltage of the normal pixel is in the first sensing range of the ADC.

3. The display device of claim 2, wherein the sensing voltage of the defective pixel is in a threshold range of the first sensing range.

4. The display device of claim 2, wherein the sensing range controller is configured to change the first sensing range to a second sensing range that encompasses both the sensing voltage of the normal pixel and the sensing voltage of the defective pixel.

5. The display device of claim 4, wherein the timing controller is configured to calculate the threshold voltage of the driving transistor in each of the normal pixel and the defective pixel based on the sensing voltage of the normal pixel and the sensing voltage of the defective pixel.

6. The display device of claim 5, wherein the timing controller further comprises a compensation range controller configured to compensate a deviation between the calculated threshold voltages of the driving transistors in the normal pixel and the defective pixel.

7. The display device of claim 6, wherein the compensation range controller is configured to calculate a compensation voltage applied to the gate electrode of the driving transistor and a driving reference voltage applied to a source electrode of the driving transistor in each of the normal pixel and the defective pixel.

8. The display device of claim 7, wherein the compensation voltage is calculated based on the threshold voltage of the driving transistor in each pixel, a voltage constant, and a gate voltage applied to the gate electrode.

9. The display device of claim 8, wherein the driving reference voltage is calculated based on the driving reference voltage modified based on the voltage constant.

10. The display device of claim 9, wherein the driving reference voltage charges a reference capacitor during a sensing period and applies the driving reference voltage to a terminal of a sensing transistor.

11. A method comprising: activating a driving transistor of each pixel of a display during a sensing period; converting a voltage into sensing information output for each pixel using an analog-to-digital converter (ADC) configured in a first sensing range, wherein the sensing information corresponds to a threshold voltage of the driving transistor; calculating the threshold voltage of the driving transistor in each pixel based on the sensing information; detecting a defective pixel based on the sensing information of the pixels; and in response to detecting the defective pixel, adjusting the ADC to sense the defective pixel using a second sensing range.

12. The method of claim 11, wherein the second sensing range comprises a first portion including a normal pixel range and a second portion corresponding to the defective pixel.

13. The method of claim 12, further comprising:
- calculating a first offset to apply to a driving reference voltage applied to a terminal of a sensing transistor during the sensing period based on the sensing information; and
- calculating a second offset to apply to the threshold voltage; and
- sensing the driving transistor of the defective pixel based on the first offset, the second offset, and the second sensing range.

* * * * *